S. J. PRATER.
HORSE DETACHER.
APPLICATION FILED DEC. 11, 1915.
1,194,661.
Patented Aug. 15, 1916.
2 SHEETS—SHEET 1.
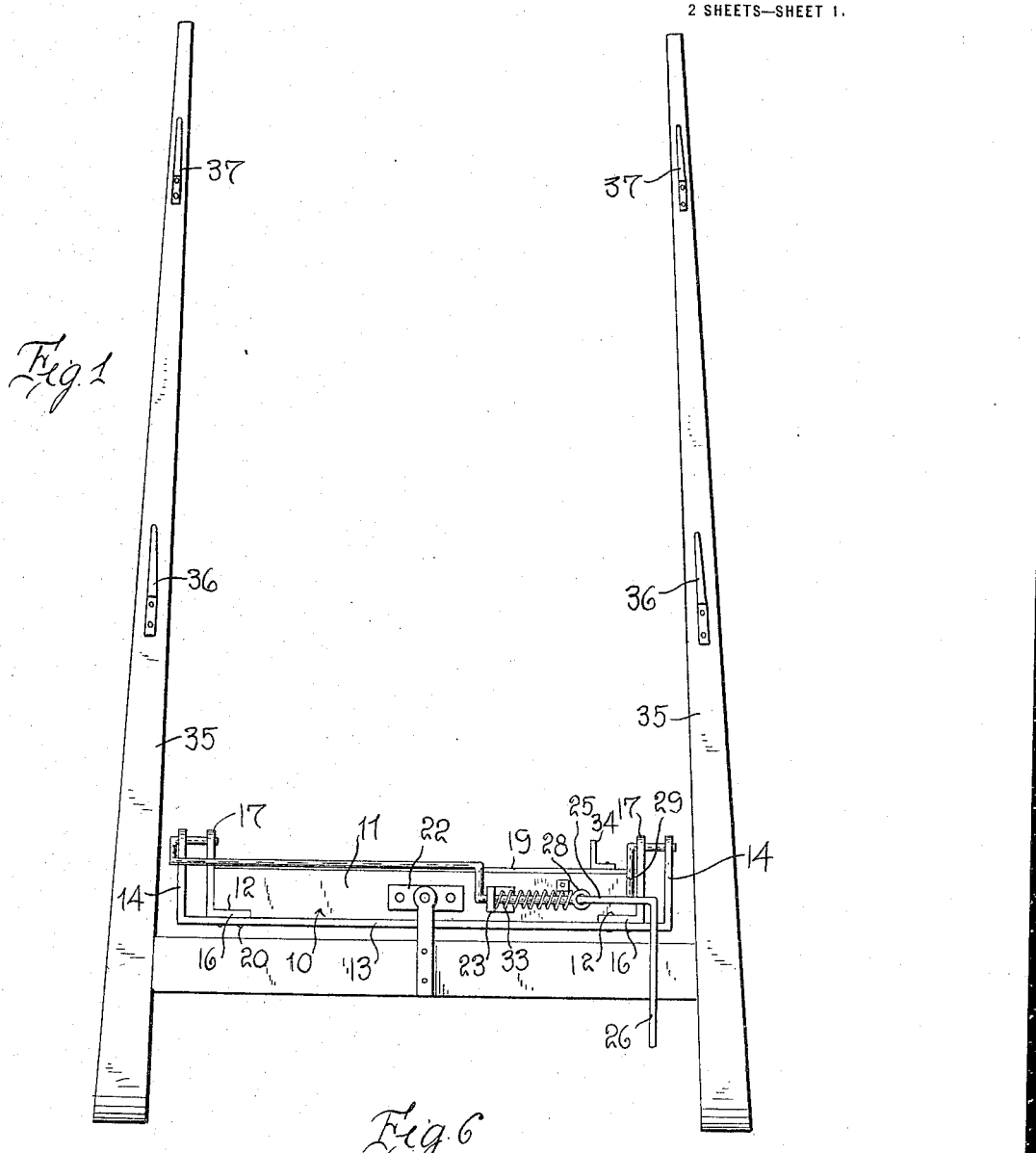
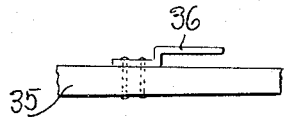
Inventor
SAMUEL J. PRATER
By Watson E. Coleman
Attorney S. J. PRATER.
HORSE DETACHER.
APPLICATION FILED DEC. 11, 1915.
1,194,661.
Patented Aug. 15, 1916.
2 SHEETS—SHEET 2.
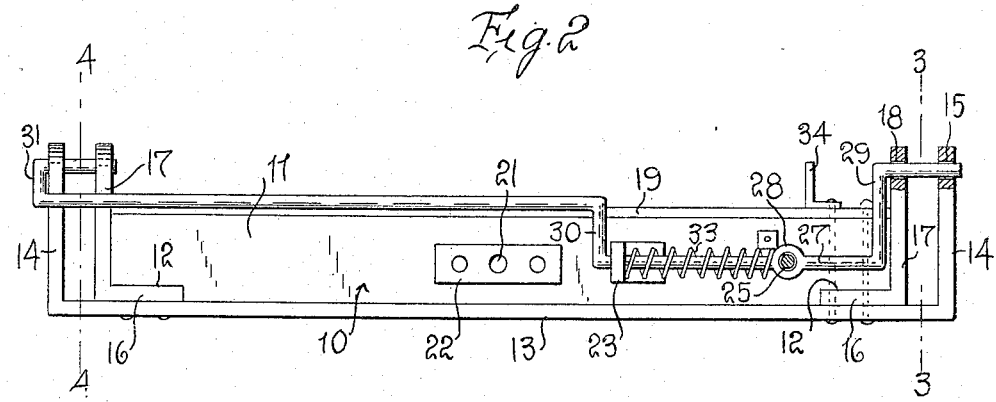
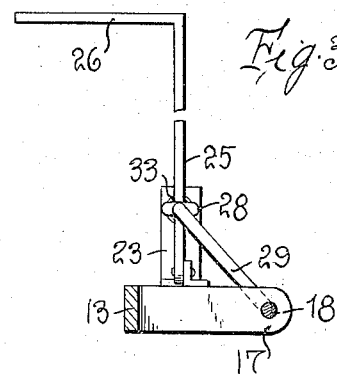
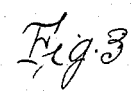
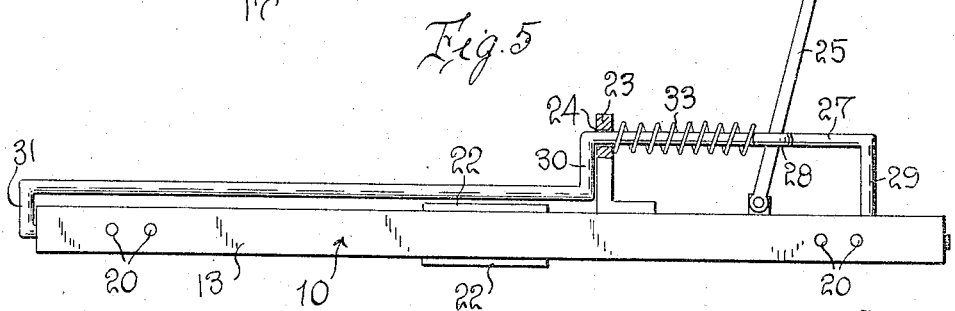
Inventor
SAMUEL J. PRATER
By Watson E. Coleman
Attorney

UNITED STATES PATENT OFFICE.

SAMUEL J. PRATER, OF CLIFTON, TENNESSEE.

HORSE-DETACHER.

1,194,661. Specification of Letters Patent. Patented Aug. 15, 1916.

Application filed December 11, 1915. Serial No. 66,366.

*To all whom it may concern:*

Be it known that I, SAMUEL J. PRATER, a citizen of the United States, residing at Clifton, in the county of Wayne and State of Tennessee, have invented certain new and useful Improvements in Horse-Detachers, of which the following is a specification, reference being had to the accompanying drawings.

This invention relates to draft devices whereby draft animals are connected to vehicles, and more particularly to a swingletree so constructed that the draft animal may be very readily released therefrom either in case of the horse running away or in case it is otherwise desirable.

The general object of my invention is the provision of a very simple horse detacher, so constructed that the horse may be released without however detaching the shafts from the vehicle.

A further object of the invention is the provision of a device of this character so formed that the traces may be connected to the swingletree or disconnected therefrom by the operation of a lever disposed in convenient relation to the driver's seat.

Still another object of the invention is the provision of means on the swingletree for detachably engaging the traces of a draft animal and of means upon the shafts of the vehicle for detachably engaging the harness, so constructed that when the traces are released from the swingletree the draft animal may draw the harness off out of its connection with the shafts so that the horse can continue without dragging the vehicle after it.

Other objects will appear in the course of the following description.

My invention is illustrated in the accompanying drawings, wherein:

Figure 1 is a plan view of my invention as applied to a pair of shafts; Fig. 2 is an enlarged top plan view of my device, the ears of one end being partly in section; Fig. 3 is a section on the line 3—3 of Fig. 2; Fig. 4 is a section on the line 4—4 of Fig. 2; Fig. 5 is a rear elevation; Fig. 6 is a fragmentary side elevation of one of the shafts 35.

My invention consists in a swingletree, which, as will hereafter appear, may also be used as part of a double-tree, which swingletree is designated generally 10. As illustrated, this swingletree has a body 11, preferably of wood, and this body is under-cut at its ends as at 12. Attached to the body 11 and extending longitudinally therealong at the rear face thereof is a metallic strip 13 which at its ends is forwardly bent to form the ears 14, these ears being perforated at 15. Disposed between the under-cut portion 12 of the body 11 and the strip 13 is an angular member having a base 16 which is disposed within the recess formed between the body 11 and the strip 13 and has an outwardly projecting ear 17 which is perforated at 18, the perforation registering with the perforation 15 of the corresponding ear 14. The outer face of the body 11 is strengthened by a longitudinally extending metallic strip 19. The strips 13 and 19 are bolted or riveted to each other by bolts or rivets 20, and these bolts or rivets also pass through the angular braces 16 of the ears 17. These ears are spaced just sufficiently far apart to receive between them the end of a trace or tug.

The middle of the body 11 is formed with a perforation 21 for the passage of the usual bolt holding the swingletree to the clevis, and the upper and lower faces of the body are reinforced or protected by means of the plates 22 in the usual manner. Mounted upon the upper face of the body 11 is a short standard 23 shown as formed with an angle iron whose base is riveted or bolted to the body 11. This standard 23 is formed at its upper end with an eye 24. Pivotally mounted upon the upper face of the body 11 is a lever 25 whose upper end is angularly bent to form a handle 26. This lever 25 is designed to operate a plunger rod 27 which extends parallel to the length of the body 11 and which passes through the eye 24 and is formed with a loop or ring 28 through which the lever 25 passes. At one side of the lever 25 and of the ring 28 the plunger rod is downwardly and forwardly bent as at 29 and then laterally extended so as to pass through the openings 18 and 15 of the ears 17 and 14 respectively. At the opposite side of the standard 23 the plunger rod is bent downward and forward, as at 30, and then longitudinally extended to a point beyond the ear 14 on that side and is then angularly bent as at 31 and then extended reversely so as to pass through the openings 15 and 18 on the trace-engaging ears on that side of the singletree. A spring 33 surrounds the plunger rod and is disposed between the standard 23 and the ring 28 so that, as in Fig. 2, the plunger rod is urged over to the right but if shifted against the force of the spring the plunger rod may be forced to the left. A stop 34 is so disposed that the plunger rod when shifted to the left will be stopped from further movement when the plunger rod has been withdrawn entirely from a position across the pairs of ears 14 and 17. When the lever is released, however, the plunger rod will be forced so as to carry its ends through both of the perforations 15 and 18 through each pair of ears, and of course across the space between these ears.

The mechanism heretofore described permits the engagement of the traces with the swingletree and it is obvious that when the plunger is withdrawn from its position across the ears 15 and 18 the traces will be released. It is necessary however, to provide means whereby the draft animal may be released from the shafts or whereby a forward movement of the draft animal relative to the shafts will release it therefrom. To this end I mount upon the shafts 35 the angular irons 36 and 37. The irons 36 engage with the pull-back straps of the harness while the irons 37 are engaged by the loops which ordinarily support the shafts. It will be obvious now that under these circumstances when the plunger is retracted so as to release the tugs or traces the draft animal may move forward and will draw the tug straps and shaft supporting loops out of engagement with the irons 36 and 37, respectively, thus releasing the draft animal from the wagon.

While I have above described my device as applied to a vehicle drawn by a single horse and having a pair of shafts, it is obvious that two swingletrees may be connected to an evener bar or whiffletree so as to provide for engaging two draft animals to a vehicle. Under these circumstances the pole or tongue of the wagon does not require the irons 36 and 37 inasmuch as the pole is supported by means of a yoke having an eye through which the end of the pole passes. While I have described and illustrated my device as applied to a swingletree operating with a pair of shafts, it will be understood that I include in my invention the application of my invention to a double-tree or rather to a pair of swingletrees of a double-tree.

It will be seen that with my invention a horse may be released from a vehicle almost instantly and thus if the horse is running away or becomes frightened and dangerous it can be immediately detached from the vehicle, thus preventing any chance of accident. It is obvious also that the device may be used for releasing horses from a vehicle when they enter the barn or drive up to the house and that it is not necessarily for use only in an emergency. It may be applied to all wagons, vehicles or machines which are drawn by draft animals and with single or two-horse vehicles. Where chains are fastened to the pole as sometimes occurs on two-horse heavy draft wagons, these chains can engage with one of the angular irons 37 which may be attached to the pole of the wagon in an obvious manner.

Having described the invention, what I claim is:

1. In a horse detacher, a swingletree having a pair of forwardly extending spaced ears at each end, the ears being perforated and adapted to receive a trace between each pair of ears, a longitudinally disposed plunger rod slidingly mounted upon the upper face of the swingletree, said plunger rod intermediate its ends being disposed above the face of the swingletree, one end of the rod being bent downwardly and forward and then angularly bent to extend through the perforations of one pair of ears, the other end of said intermediate portion of the rod being bent downward and forward to the forward edge of the swingletree, then extended longitudinally therealong over the second pair of ears, then downwardly bent and re-bent upon itself to pass through the perforations of said ears, a spring surrounding the intermediate portion of the rod, a fixed abutment through which the rod passes and against which the spring bears, and a lever pivotally connected to the upper face of the swingletree and operatively connected to the rod adjacent one end of the spring whereby upon a movement of the lever in one direction the ends of the rod will be retracted from engagement with the ears and upon the release of said lever the ends of the rod will be projected through the perforations of the ears.

2. In a horse detacher, a swingletree having a pair of forwardly extending spaced ears at each end, the ears being perforated and adapted to receive a trace between each pair of ears, a longitudinally disposed plunger rod slidingly mounted upon the upper face of the swingletree, said plunger rod intermediate its ends being disposed above the face of the swingletree, one end of the rod being bent downward and forward and then angularly bent to extend through the perforations of one pair of ears, the other end of said intermediate portion of the rod being bent downward and forward to the forward edge of the swingletree, then extended longitudinally therealong over the second pair of ears, then downwardly bent and re-bent upon itself to pass through the perforations of said ears, a spring surrounding the intermediate portion of the rod, a fixed abutment through which the rod passes and against which the spring bears, a lever pivotally connected to the upper face of the swingletree and operatively connected to the rod adjacent one end of the spring whereby upon a movement of the lever in one direction the ends of the rod will be retracted from engagement with the ears and upon the release of said lever the ends of the rod will be projected through the perforations of the ears, and a stop mounted upon the forward face of the swingletree and engaging with the first-named angular bend of the rod to limit the retractive movement of the rod and prevent the entire retraction of the ends of the rod from one of each pair of ears.

3. In a horse detacher, a swingletree having recesses on its rear face and at the ends of the tree, angle irons mounted in said recesses and extending across the ends of the swingletree and projecting beyond it, a reinforcing bar disposed upon the front face of the swingletree and extending between the angle irons, a reinforcing bar extending along the rear face of the swingletree and extending beyond it and having angular ends extending parallel to the forwardly projecting portions of the angle irons, said angle irons and the ends of the last-named bar together forming pairs of ears, the ears being perforated, bolts passing through the ends of the swingletree, the angle irons and said front and rear reinforcing bars, a plunger rod longitudinally shiftable into the perforations of each pair of ears and through the corresponding trace, said plunger rod being mounted upon the swingletree, and means for operating said plunger rod.

In testimony whereof I hereunto affix my signature in the presence of two witnesses.

SAMUEL. J. PRATER.

Witnesses:
JOHN HALFORD,
EDGAR HILTON.

Copies of this patent may be obtained for five cents each, by addressing the "Commissioner of Patents, Washington, D. C."